United States Patent
Williams et al.

(10) Patent No.: US 8,560,311 B2
(45) Date of Patent: Oct. 15, 2013

(54) SYSTEM AND METHOD FOR ISOLATING UNCERTAINTY BETWEEN SPEECH RECOGNITION AND NATURAL LANGUAGE PROCESSING

(76) Inventors: Robert W. Williams, Pacific Palisades, CA (US); John E. Keane, Metuchen, NJ (US)

(*) Notice: Subject to any disclaimer, the term of this patent is extended or adjusted under 35 U.S.C. 154(b) by 195 days.

(21) Appl. No.: 12/889,172

(22) Filed: Sep. 23, 2010

(65) Prior Publication Data

US 2011/0213616 A1    Sep. 1, 2011

Related U.S. Application Data

(60) Provisional application No. 61/245,042, filed on Sep. 23, 2009.

(51) Int. Cl.
  *G10L 15/16*    (2006.01)
  *G10L 15/18*    (2013.01)
  *G06F 17/20*    (2006.01)

(52) U.S. Cl.
  USPC .......... 704/232; 704/9; 704/257; 706/20

(58) Field of Classification Search
  USPC .......... 704/9, 231, 236, 252, 257, 232; 706/20
  See application file for complete search history.

(56) References Cited

U.S. PATENT DOCUMENTS

| | | | |
|---|---|---|---|
| 6,178,398 B1 * | 1/2001 | Peterson et al. | 704/232 |
| 6,397,181 B1 * | 5/2002 | Li et al. | 704/256.4 |
| 6,434,524 B1 * | 8/2002 | Weber | 704/257 |
| 7,107,207 B2 * | 9/2006 | Goodman | 704/9 |
| 7,249,019 B2 * | 7/2007 | Culy et al. | 704/257 |
| 7,363,212 B2 * | 4/2008 | Erhart et al. | 704/2 |
| 7,383,172 B1 * | 6/2008 | Jamieson | 704/9 |
| 2001/0041978 A1 * | 11/2001 | Crespo et al. | 704/257 |
| 2001/0041980 A1 * | 11/2001 | Howard et al. | 704/270 |
| 2004/0143436 A1 * | 7/2004 | Huang et al. | 704/257 |
| 2005/0055209 A1 * | 3/2005 | Epstein et al. | 704/255 |
| 2005/0149319 A1 * | 7/2005 | Honda et al. | 704/9 |
| 2007/0288231 A1 * | 12/2007 | Mukerjee et al. | 704/9 |
| 2008/0048908 A1 * | 2/2008 | Sato | 342/200 |
| 2010/0036660 A1 * | 2/2010 | Bennett | 704/231 |
| 2010/0191530 A1 * | 7/2010 | Nakano et al. | 704/244 |
| 2012/0262461 A1 * | 10/2012 | Fisher et al. | 345/467 |

OTHER PUBLICATIONS

Wutiwiwatchai et al., "Confidence Scoring for ANN-Based Spoken Language Understanding", Automatic Speech Recognition and Understanding 2003, ASRU '03, 2003 IEEE Workshop, Nov. 30-Dec. 3, 2003, pp. 566 to 571.*

* cited by examiner

*Primary Examiner* — Martin Lerner
(74) *Attorney, Agent, or Firm* — The Webb Law Firm

(57) ABSTRACT

A speech recognition system includes a natural language processing component and an automated speech recognition component distinct from each other such that uncertainty in speech recognition is isolated from uncertainty in natural language understanding, wherein the natural language processing component and an automated speech recognition component communicate corresponding weighted meta-information representative of the uncertainty.

19 Claims, 1 Drawing Sheet

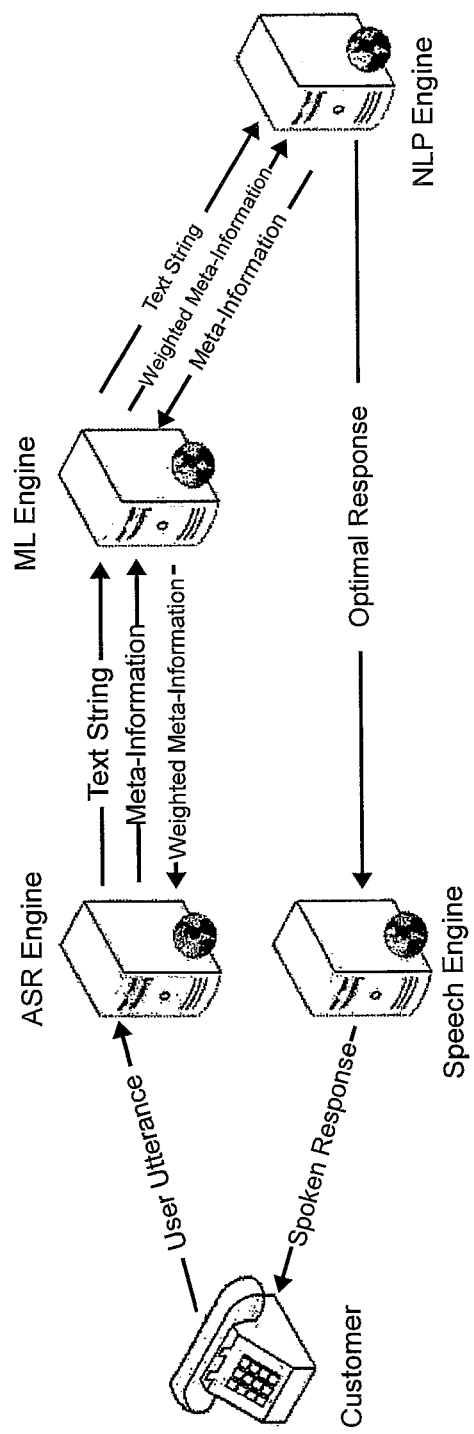

SYSTEM AND METHOD FOR ISOLATING UNCERTAINTY BETWEEN SPEECH RECOGNITION AND NATURAL LANGUAGE PROCESSING

CROSS REFERENCE TO RELATED APPLICATIONS

This application claims the benefit of U.S. Provisional Patent Application No. 61/245,042 filed Sep. 23, 2009, and titled "A System and Method For the Adaptive Use Of Uncertainty Information In Speech Recognition To Assist In the Recognition of Natural Language Phrases," the contents of which are incorporated herein by reference.

BACKGROUND OF THE INVENTION

1. Field of the Invention

The present invention relates to a speech recognition system and method and, more particularly, to a speech recognition system and method utilizing meta-information to improve accuracy of the system.

2. Description of Related Art

Correctly recognizing and responding to spoken natural language phrases is very difficult for automated systems. There are multiple sources of uncertainty that can arise from variability in the inputs, namely, variability in the quality and pronunciation of the speech, variability in the acquisition and processing of the speech input, and variability in the phrasing (the words used and their order) of the input. Prior art automated speech recognition technology is capable of assessing a numerical quality metric to individual words and phrases that it is attempting to recognize, thereby, indicating how confident it is that it has successfully recognized these individual words and phrases. Typically, this numerical quality metric will be made available in the text output of the speech recognition technology to give an indication of the confidence of the recognition of each of the elements output.

However, the problem of correctly understanding a spoken phrase extends beyond the problem of identifying just the spoken words. The number of ways that a request can be phrased by a user is virtually unbounded. Prior art automated speech recognition systems treat the uncertainty in speech and the uncertainty in phrasing with a single approach that attempts to compensate for both simultaneously, or they avoid the problem of phrasing uncertainty altogether by forcing the user to a highly constrained format for making requests.

It is, therefore, desirable to overcome the above problems and others by providing a more accurate and efficient speech recognition system and method directed thereto.

SUMMARY OF THE INVENTION

As with many complex problems, a greater effectiveness in handling uncertainty may be achieved by first decomposing these problems and treating each with specialized solutions targeted at one specific kind of uncertainty. When decomposing a complex problem, it is still important to pass information between the separate components of the system to inform each of the progress of the others. This information would include the results of the recognition from each component, as well as meta-information about the results that might include uncertainty metrics or alternative interpretation. The difficulty in utilizing this meta-information relates to predicting in advance how much significance to give to each element. This significance may vary over specific problem domains or applications, or may change over time. This limits the effectiveness of any pre-determined approach to using meta-information across components of such a system. To this end, the present invention allows each component in the speech recognition system to separately optimize performance while weighting the meta-information shared among the components.

Generally, the present invention includes an automated speech recognition engine (ASR), an adaptive machine learning (ML) system, a natural-language processing (NLP) system, and a speech engine. The ASR engine takes as input spoken phrases and outputs a set of text words and word sequences, along with normalized numerical information (e.g., meta-information) that indicates the likelihood that each word or word sequence is a correct match to the spoken input (i.e., match uncertainty). The adaptive ML system takes meta-information from the ASR engine and adjusts the weighting of that information before passing it to the NLP engine, and takes meta-information from the NLP engine and adjusts the weighting of that information before passing it to the ASR engine. The NLP system takes a set of words and word sequences along with normalized numerical information (e.g., meta-information) that indicates the likelihood that each word or word sequence is a correct match to the spoken input and returns a text string that is the optimal response to the input and a numerical value that indicates the likelihood that the response is the correct (i.e., confidence factor). The speech engine utilizes text to speech (TTS) or recorded utterances and sends the correct TTS rendering of the text string or the correct recorded utterance to the appropriate destination.

In operation, the system will take a spoken phrase as input and process the input into a set of probable words and word sequences using the ASR engine. The ASR engine will pass the resulting words, word sequences and meta-information about the words and words sequences, to the ML engine. The ML engine will adjust the weighting of each of the elements of the meta-information according to an algorithm learned by observing the bi-directional flow of meta-information and pass the weighted meta-information to the NLP engine. The NLP engine will process the words and word sequences as a natural language phrase, using the weighted meta-information to pre-process the words and word sequences, return the meta-information to the ML engine, and pass the text response to the speech engine which will produce the appropriate speech response. The ML engine will adjust the weighting of each of the elements of the meta-information according to an algorithm learned by observing the bi-directional flow of meta-information and pass the weighted meta-information to the NLP engine. The ML engine will adjust the weighting of the meta-information in one direction so as to optimize the element values of the meta-information received in the other direction, according to some statistical learning algorithm.

The present invention provides superior recognition of spoken information. By separating the natural language processing from the ASR, each component is allowed to separately optimize performance. The present invention is not tied to a single ASR or NLP technology, thereby operable with many different approaches. Uncertainty in speech recognition is isolated from uncertainty in natural language understanding, thereby, allowing these aspects to be independently addressed. Speech recognition meta-information allows better NLP recognition by making the NLP engine aware of uncertainty in speech recognition. The NLP meta-information allows better speech recognition by informing the ASR engine of NLP constraints. An adaptive machine-learning approach to weighting of meta-information allows a system to adapt to multiple environments and applications without requiring explicit re-coding of algorithms.

Still other features of the invention may become apparent to those of ordinary skill in the art upon reading and understanding the following detailed description, taken with the accompanying drawing. It is to be expressly understood, however, that the drawing is for the purpose of illustration and description only and is not intended as a definition of the limits of the invention.

BRIEF DESCRIPTION OF THE DRAWINGS

The FIGURE is a schematic illustration of the components of the speech recognition system and communicative connectivity thereof, in accordance with the present invention.

DETAILED DESCRIPTION OF THE INVENTION

The present invention will now be described with reference to the accompanying FIGURE. It is to be understood that the specific system illustrated in the attached figures and described in the following specification is simply an exemplary embodiment of the present invention.

The FIGURE depicts the customer, ASR engine, ML engine, NLP engine, and speech engine and the data communicated therebetween. The customer may be connected to the ASR engine and speech engine via a telephone network, whereas the ASR engine, ML engine, and NLP engine may be connected to each other via a local or wide area distributed communications network. In another embodiment, the spoken input may be received by a microphone, or as a stream of digitized audio data via a data network. It is to be understood that communications between the above communicative entities may be implemented in a variety of ways including, but not limited to, land-line, wireless, and satellite-based systems. Thus, the communication links described hereinafter are merely exemplary and are not to be construed as limiting the invention in any manner.

The words and word sequences are passed from the ASR engine, along with the meta-information, including, but not limited to, match probabilities for each of the words and word sequences, to the ML engine. In one embodiment, alternative matches and probabilities may be included in the meta-information for each word in the spoken input.

The ML engine uses a weighting algorithm learned by observing the meta-information passed from the ASR engine to the NLP engine and the corresponding meta-information passed from the NLP engine to the ASR engine to adjust the weights so as to optimize (minimize or maximize, as appropriate) designated elements of the meta-information passed from the NLP engine to the ASR engine. In one embodiment, the meta-information passed from the NLP engine may include a "confidence metric", which the weighting will be adjusted to maximize. The learning algorithm may be any one of many well-known algorithms known to those having ordinary skill in the art, including, but not limited to, Bayes-based statistical models or neural networks.

The NLP engine uses the weighted meta-information to pre-process the words and word sequences before processing them to select the optimal response, thereby giving greater importance to the words and sequences that have the higher adjusted match probability values. Alternative matches may be successively tried, until all alternatives are exhausted, or a sufficiently good response has been identified. In other embodiments, additional pre-processing of the words and word sequences may be employed, including spelling correction, alias substitution, removal of informationally unimportant words, word reordering, and other similar techniques.

When a response has been determined by the NLP engine, it is passed to the speech engine to be rendered as speech. In one embodiment shown, as shown in the FIGURE, the spoken response is returned via the telephone network. In other embodiments, the response may be output through speakers or headset, or sent as digitized audio via a data network. The meta-information about the response, such as a numerical confidence factor, is passed to the ML engine.

The ML engine uses a weighting algorithm learned by observing the meta-information passed from the NLP engine to the ASR engine and the corresponding meta-information passed from the ASR engine to the NLP engine to adjust the weights so as to optimize (minimize or maximize, as appropriate) designated elements of the meta-information passed from the ASR engine to the NLP engine. In one embodiment, the meta-information passed from the ASR engine may include match-likelihood values for the words and word sequences, which the weighting will be adjusted to maximize. The learning algorithm may be any one of many well-known algorithms known to those having ordinary skill in the art, including, but not limited to, Bayes-based statistical models or neural networks.

The methods and systems described herein may be deployed in part or in whole through a machine that executes computer software program codes, and/or instructions on a processor. The processor may be part of a server, client, network infrastructure, mobile computing platform, stationary computing platform, cloud computing, or other computing platform. The processor may be communicatively connected to the Internet or any other distributed communications network via a wired or wireless interface. The processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

The methods and/or processes described above, and steps thereof, may be realized in hardware, software or any combination of hardware and software suitable for a particular application. The hardware may include a general purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

The computer executable code may be created using a structured programming language such as C, an object-oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The invention claimed is:

1. A speech recognition system comprising at least one computer including at least one processor, the at least one computer comprising a natural language processing component, a machine learning engine, and an automated speech recognition component, the natural language processing component and the automated speech recognition component being distinct from each other such that uncertainty in speech recognition is isolated from uncertainty in natural language understanding, wherein the natural language processing component and the automated speech recognition component communicate corresponding weighted meta-information representative of the uncertainty, the corresponding weighted meta-information generated at least partially by the machine learning engine, wherein the machine learning engine is configured to: receive, from the automated speech recognition component, weighted meta-information; adjust a weighting of the weighted meta-information based at least partially on a statistical learning algorithm; and communicate the adjusted weighted meta-information to the natural language processing component.

2. The speech recognition system of claim 1, wherein the statistical learning algorithm is developed by the machine learning engine by analyzing a bi-direction flow of the corresponding weighted meta-information between the natural language processing component and the automated speech recognition component.

3. The speech recognition system of claim 2, wherein the statistical weighting algorithm comprises at least one of a Bayes-based statistical model and a neural network.

4. The speech recognition system of claim 1, wherein the corresponding weighted meta-information generated by the natural language processing component comprises at least one confidence metric.

5. The speech recognition system of claim 1, wherein the machine learning engine is further configured to receive, from the automated speech recognition component, a plurality of words or word segments from the automated speech recognition component, and wherein the weighted meta-information received from the automated speech recognition component comprises match-likelihood values for at least a portion of the plurality of words or word segments.

6. The speech recognition system of claim 1, wherein the natural language processing component is further configured to communicate, to a speech engine, a response generated at least partially based on the corresponding weighted meta-information.

7. A system for isolating uncertainty between speech recognition and natural language processing, the system comprising at least one computer including at least one processor, the at least one computer comprising:
   (a) an automated speech recognition component configured to generate, based on speech input, at least one of words and word sequences, the at least one of words and word sequences associated with meta-information;
   (b) a natural language processing component distinct from the automated speech recognition component, the natural language processing component configured to process the at least one of words and word sequences based at least partially on weighted meta-information; and
   (c) a machine learning engine configured to:
      (i) receive the meta-information from the automated speech recognition system;
      (ii) generate the weighted meta-information for the at least one of words and word sequences based at least partially on a learned weighting algorithm and the at least one of words and word sequences, wherein the learned weighting algorithm is influenced by the machine learning engine by analyzing meta-information received from the automated speech recognition component and the natural language processing component.

8. The system of claim 7, wherein the machine learning engine is further configured to:
   (iii) receive, from the natural language processing component, corresponding meta-information; and
   (iv) influence the learned weighting algorithm based at least partially on the meta-information received from the automated speech recognition component and the corresponding meta-information received from the natural language processing component.

9. The system of claim 8, wherein the corresponding meta-information received from the natural language processing component comprises at least one confidence metric.

10. The system of claim 7, wherein the weighted meta-information comprises match probabilities for the at least one of words and word sequences.

11. The system of claim 10, wherein the natural language processing component is further configured to process the at least one of words and word sequences based at least partially on the match probabilities.

12. The system of claim 11, wherein the natural language processing component is further configured to communicate, to a speech engine, a response generated by the processing of the at least one of words and word sequences.

13. The system of claim 7, wherein the natural language processing component is further configured to pre-process the at least one of words and word sequences by at least one of the following: spelling correction, alias substitution, removal of words determined to be informationally unimportant, word reordering, or any combination thereof.

14. The system of claim 7, wherein the learned weighting algorithm comprises at least one of a Bayes-based statistical model and a neural network.

15. A computer-implemented method for isolating uncertainty between speech recognition and natural language processing, the method using a speech recognition engine and a natural language processing engine that are distinct from one another, the method comprising:
- receiving speech input from at least one user;
- generating, with the automated speech recognition engine and at least one processor, at least one word or word sequence associated with meta-information based at least partially on the speech input, the meta-information comprising at least one match probability for each of the at least one word or word sequence;
- generating, with a machine learning engine, weighted meta-information based at least partially on the at least one word or word sequence and the meta-information;
- generating, with the natural language processing engine and at least one processor, corresponding meta-information based at least partially on the weighted meta-data and the at least one word or word Sequence;
- communicating the corresponding meta-information from the natural language processing engine to the machine learning engine; and
- generating, with the natural language processing engine, an output response based at least partially on the weighted meta-information.

16. The computer-implemented method of claim 15, wherein the corresponding meta-information comprises a confidence metric generated by the natural language processing engine.

17. The computer-implemented method of claim 15, wherein the learned weighting algorithm is influenced by at least the weighted meta-information and the corresponding meta-information.

18. The computer-implemented method of claim 15, wherein the weighted meta-information comprises match probabilities for the at least one word or word sequence sequences.

19. The computer-implemented method of claim 15, wherein the natural language processing component is configured to communicate, to a speech engine, the output response.

* * * * *

UNITED STATES PATENT AND TRADEMARK OFFICE
CERTIFICATE OF CORRECTION

PATENT NO. : 8,560,311 B2  Page 1 of 1
APPLICATION NO. : 12/889172
DATED : October 15, 2013
INVENTOR(S) : Robert Williams et al.

It is certified that error appears in the above-identified patent and that said Letters Patent is hereby corrected as shown below:

In the Claims

Column 8, Line 4, Claim 15, delete "Sequence;" and insert -- sequences; --

Column 8, Line 22-23, Claim 18, after "word sequence" insert -- or --

Signed and Sealed this
Sixth Day of May, 2014

Michelle K. Lee
*Deputy Director of the United States Patent and Trademark Office*